(12) United States Patent
Keller et al.

(10) Patent No.: US 8,184,934 B2
(45) Date of Patent: May 22, 2012

(54) OPTICAL FIBER CABLE

(75) Inventors: David Keller, Cary, NC (US); Norman Andrew Punch, Jr., Holly Springs, NC (US); Jerry Freeman, Apex, NC (US); Bulent Kose, Downingtown, PA (US); Jeff Rosenquist, Wendell, NC (US); Lisa Huff, Mechanicsburg, PA (US); Alfred Flores, Holly Springs, NC (US)

(73) Assignee: Nexans, Paris (FR)

( * ) Notice: Subject to any disclaimer, the term of this patent is extended or adjusted under 35 U.S.C. 154(b) by 539 days.

(21) Appl. No.: 12/321,013

(22) Filed: Jan. 14, 2009

(65) Prior Publication Data

US 2009/0263089 A1    Oct. 22, 2009

Related U.S. Application Data

(63) Continuation-in-part of application No. 11/893,365, filed on Aug. 14, 2007, now Pat. No. 7,609,926.

(60) Provisional application No. 61/011,088, filed on Jan. 14, 2008.

(51) Int. Cl.
*G02B 6/44* (2006.01)

(52) U.S. Cl. ........ 385/109; 385/100; 385/110; 385/111; 385/112; 385/113

(58) Field of Classification Search .......... 385/100, 385/109, 110, 111, 112, 113
See application file for complete search history.

(56) References Cited

U.S. PATENT DOCUMENTS

| | | | | |
|---|---|---|---|---|
| 4,964,691 A | * | 10/1990 | Nelson et al. | 385/110 |
| 7,609,926 B2 | * | 10/2009 | Rosenquist et al. | 385/109 |

* cited by examiner

*Primary Examiner* — Jennifer Doan
(74) *Attorney, Agent, or Firm* — Sofer & Haroun, LLP

(57) ABSTRACT

A fiber optic cable having a jacket, at least one tube and at least two fibers within the tube in a loose tube arrangement. The fibers within the tube have a fiber length differential substantially in the range of 0.01%-0.04%.

16 Claims, 16 Drawing Sheets

(PRIOR ART)

(PRIOR ART)

OPTICAL FIBER CABLE

RELATED APPLICATION

This application is a continuation-in-part of U.S. patent application Ser. No. 11/893,365 filed on Aug. 14, 2007 now U.S. Pat. No. 7,609,926 and also claims priority to U.S. Provisional Patent Application No. 61/011,088, filed on Jan. 14, 2008, the entirety of which are incorporated by reference.

FIELD OF THE INVENTION

The present invention relates to the field of optical fiber cables. More particularly, the present invention relates to the field of optical fiber cables having an improved design, attenuation and skew attributes.

BACKGROUND

Optical fiber cables are well known in the communication industry as cables that include one or more optical fibers for optically transmitting communication signals.

Among other constructions, one of the popular arrangements for optical fibers cables is a bundling of six to twelve individual optical fibers within a tube (also referred to as a buffer tube) in a loose arrangement, allowing for some movement of the optical fibers within the tube. This is referred to as a "loose tube" arrangement. Moreover, to form the optical fiber cable, one or more tubes may be bundled within an outer cable jacket for additional protection from the environment and also to provide an increased number of fibers within a particular cross section, useful for commercial installations.

However, there are several competing concerns that affect the design and production of such optical fiber cables. The first of these concerns is the optimum amount of fibers per tube. In typical installations larger optical fiber cables have multiple tubes therein. The greater the number of fibers per tube, the greater the overall communication capacity for the optical fiber cable. However, more fibers per tube may result in difficulty accessing individual fibers within a tube (e.g. for connection to optical equipment). Furthermore, more fibers add weight to the cable as well as geometrical constraints, both of which add costs in the form of materials and production difficulties.

A related second drawback to existing optical fiber cables of this design is the attenuation in fiber signals that occur when the optical fiber cable is bent. Attenuation occurs when individual fibers within an optical fiber cable are bent resulting in the optical signals partially or totally exiting the fiber at bending regions. Increases in the number of fibers within each of the tubes in an optical fiber cable and their consequent geometric configuration, however restricts the possible movements of the fibers during bending, causing awkward and strained bending resulting in attenuation.

FIG. 1 shows an exemplary prior art arrangement of an optical fiber cable having seven fiber tubes within a jacket. FIG. 2 shows a hypothetical bend of the fiber cable depicted in FIG. 1. The centrally located tubes (b) can conform to the center of the bent cable, but tubes along axes (a) and (c) are either stretched or compressed, resulting in signal attenuation. Thus, the more fibers placed in fiber optic cable the more attenuation in the fiber signal, particularly with fibers closer to the inside wall of the cable jacket.

Given the constraints associated with attenuation from bending, combined with the desire to meet customer communication throughput needs by providing sufficient fibers per cable, prior art optical fiber cables are designed to include a limited number of fibers per tube (typically between 6 and 12 fibers per tube). However, even with this range of fibers per tube, the attenuation at bend radiuses that may result in significant signal attenuation.

To address this problem, prior art designs include either strength members or binding ribbons to resist bending (or to prevent over-bending as some bending is required). Other designs have added fillers such as petroleum jelly or other gels, in either the tubes or around the tubes in the jacket. U.S. Pat. No. 4,230,395 discusses an example of such gel filled tubes. Yet another method of preventing attenuation in the fibers in these cables is to strand the fibers in a helical or S-Z arrangement so that no one fiber is consistently disposed along the far side of a bend axis.

All of these solutions are less than desirable. The addition of strength members adds additional construction components, adding cost in both materials and cable construction complexity. Furthermore, the strength members add additional weight to the final product. The addition of gel fillers also adds cost in both materials and extrusion complexity, adds weight, as well as the additional drawback of a fire fuel, which contributes to such gel filled cables failing the necessary fire safety standards for certain indoor uses.

Stranding, adds significant cost to the production of a cable in that the twisting of the fibers requires that more fiber per foot of cable is necessary to span a given distance relative to a straight or non-stranded fiber cable. Also, in the stranded arrangement, fibers acquire an inherent wavy quality that includes a certain amount of bending, which can result in failure of the cladding to contain the light signal through reflection, resulting in undesired attenuation.

In addition to the above identified drawbacks associated with fiber optic cable design, such as 12 fiber cables, another attribute that is difficult to address is Skew and PMD (Polarization Modal Dispersion).

Skew refers to the detrimental time difference caused by optical signals traveling over different length fibers within the same cable over the same cable distance. This is caused by fibers having different fiber lengths relative to one another within the same length of cable.

For example, digital signals are often broken into multiple paths (ie different fibers within a cable) with the expectation that they will be re-assembled into the original set in the correct order at the other end of the cable. This requires the ability to compensate on the receiving end for any variance in the arrival time between the paths.

Receiving circuits can manage this variance, but as the rate of digital signal throughput is increased to the 40-100 gigabit range it becomes more important that the various path (fiber) lengths, physical composition, and subjected stress be as equal as possible to one another so as not to exceed the delay disparity management capabilities and "correction budget" of the electronics on the receiving end of the cable.

Currently there is no agreement in the art on the best method to measure skew. Some methods focus more on the fiber length differential, while others include all the various factors that may contribute to time delay. These methods include the Phase Shift method and Pulse Time-of-Flight method but there are other existing methods.

Polarization Mode Dispersion (PMD) is related to the feature of a communication signal whereby the signal is a modulated beam of optical light with the x and y axis arrival time being affected by variances in the glass refractive indexes in the x and y axes. This variance in the x and y axes refractive indices is called bi-refringence. PMD is related to the differential group delay (DGD) caused by this birefringence in optical fibers.

In order to avoid Skew and PMD, it has been found to ideally have all of the fibers within a cable to be of equal or nearly equal length and also to have the lowest retained stress in both the relaxed (straight) and bent/flexed states.

In the prior art, as shown in FIG. 9, one manner to address this issue is with ribbon cables, proponents of which note that the fusing of the fibers in the ribbon arrangement assures equal or nearly equal length over the course of the cable. Although the ribbon arrangement is good at keeping all of the fibers within the cable parallel and of equal length when the ribbon is flat during installation in real-world environments, the twisting, bending and coiling imparts significant stress on the fibers.

For example, when the skew of fiber ribbons are measured in a relaxed parallel state, skew results may be in the range of 0.5 to 3.0 ps/m (picoseconds/meter) based on length differential tolerances in the range of 0.01%-0.04% between fibers within the cable. However, under coiling and bending stresses, these Skew results increase by 5-15 ps/m for the reasons outlined above.

In another prior art arrangement, as shown in FIG. 10, another manner to address Skew and PMD in twelve fiber-loose tube arranged cables is to periodically bind the fibers to one another with either a binder or glue so that the overall length of the fibers remain relatively equal along the length of the cable.

However, even with the periodic binding, residual length differences caused by the manufacturing process (e.g. payoff tensions of 5-15% in the fibers during cable production) may render the fiber length differentials in the range of 0.08% to 0.16%. Such length differentials typically result in Skew measurements in the range of 4-8 ps/m.

Although initially, the Skew results are for periodic binding more than the ribbon design, unlike ribbons, the Skew results for the bound loose tube arrangement only increase in the range of an additional 3-5 ps/m during bending and installation because the fibers are free to move (relax) after installation.

OBJECTS AND SUMMARY

The present arrangement overcomes the drawbacks associated with the prior art and provides an improved optical fiber cable that is both straight and that uses the least amount of additional bend protection components (to remove fire/fuel concerns). Additionally, the fibers within the cable are of equal or substantially equal length over the length of the cable. Such a fiber cable does not contain gel fillers or excessive strength members, while simultaneously provides a plurality of optical fibers per tube within the cable. The resulting structure is thus totally dry, relatively lightweight and maintains a fiber geometry within the fiber tubes that assists in preventing attenuation of optical signal. Moreover, because the fibers are of the same length, such a cable exhibits improved Skew and PMD results.

In one arrangement, an optical fiber cable maintains one or more tubes, each of which maintain four fibers per tube, which are snugly held in a longitudinal position. The arrangement is sufficiently tight to prevent random overlapping or criss-crossing that may lead to such faults as compression induced micro bending. The arrangement also simultaneously allows for the individual repositioning of the fibers from the neutral axis (in a bend) to obtain an optimum lowest-stress position.

In one arrangement, the fibers are sufficiently loose within the tube so as to allow an installer the ability to perform a 20" strip (strip capacity) without damaging the tubes/fibers within the jacket and the tube modulus is such that it allows repositioning of the fibers in the tubes, even under colder temperatures in the range of 0° C. through-60° C.

In one arrangement, the four fiber tubes allow the fibers to be fed straight (un-stranded) during extrusion, with the possible addition of a water swellable yarn of sufficient flexibility that allows the fibers to continue repositioning themselves relative to a hypothetical neutral bend axis.

In another arrangement, in order to address the issues of Skew and PMD, the fibers within the four-fiber tubes are applied in a tension that results in all of the fibers within each of the tubes being of equal or substantially equal length so as to provide improved Skew and PMD measurements.

In one arrangement, the payoff tensions (tension near the fiber spool on the cable production line) between each of the fibers within a tube are in the range of 0-4% and preferably 2% or lower. In this arrangement, differential length tolerance measurements between the fibers with the tubes are in a range of approximately 0.01% and 0.04% resulting in Skew measurements of 0.5 to 2.0 ps/m. Thus, the present invention simultaneously provides good Skew results relative to relaxed fiber ribbon cables as well as sustained Skew results even during bending installation due to its loose tube construction.

To this end, in at least one arrangement according the following exemplary embodiments provides for a fiber optic cable having a jacket, at least one tube and at least two fibers within the tube in a loose tube arrangement. The fibers within the tube have a fiber length differential substantially in the range of 0.01%-0.04%.

DETAILED DESCRIPTION

Figure 1:
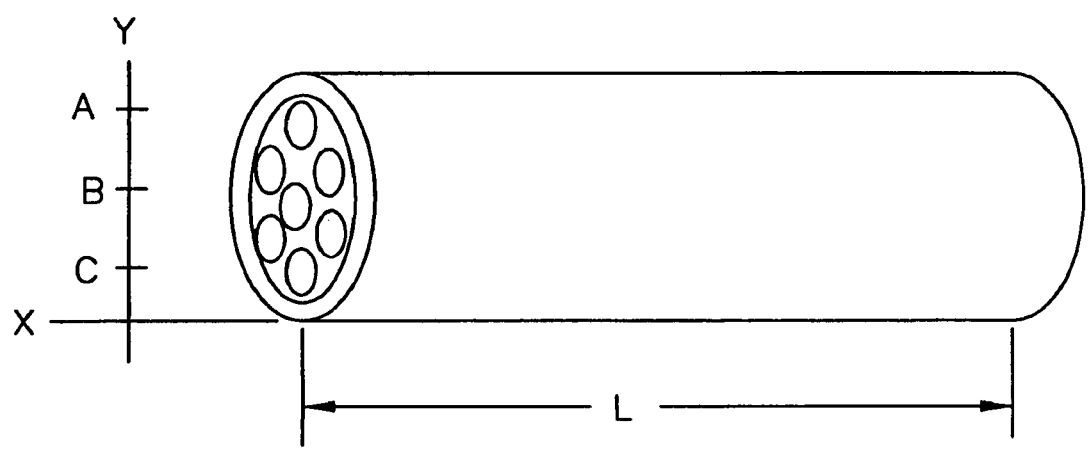
FIG. 1 shows a prior art optical fiber cable.
Figure 2:
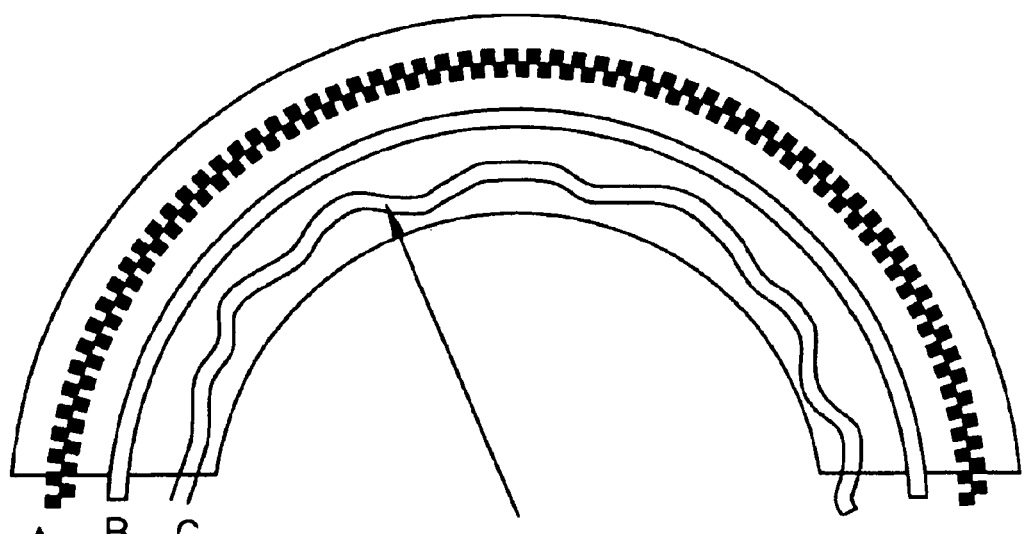
FIG. 2 shows a bent version of the prior art optical fiber cable from FIG. 1.
Figure 3:
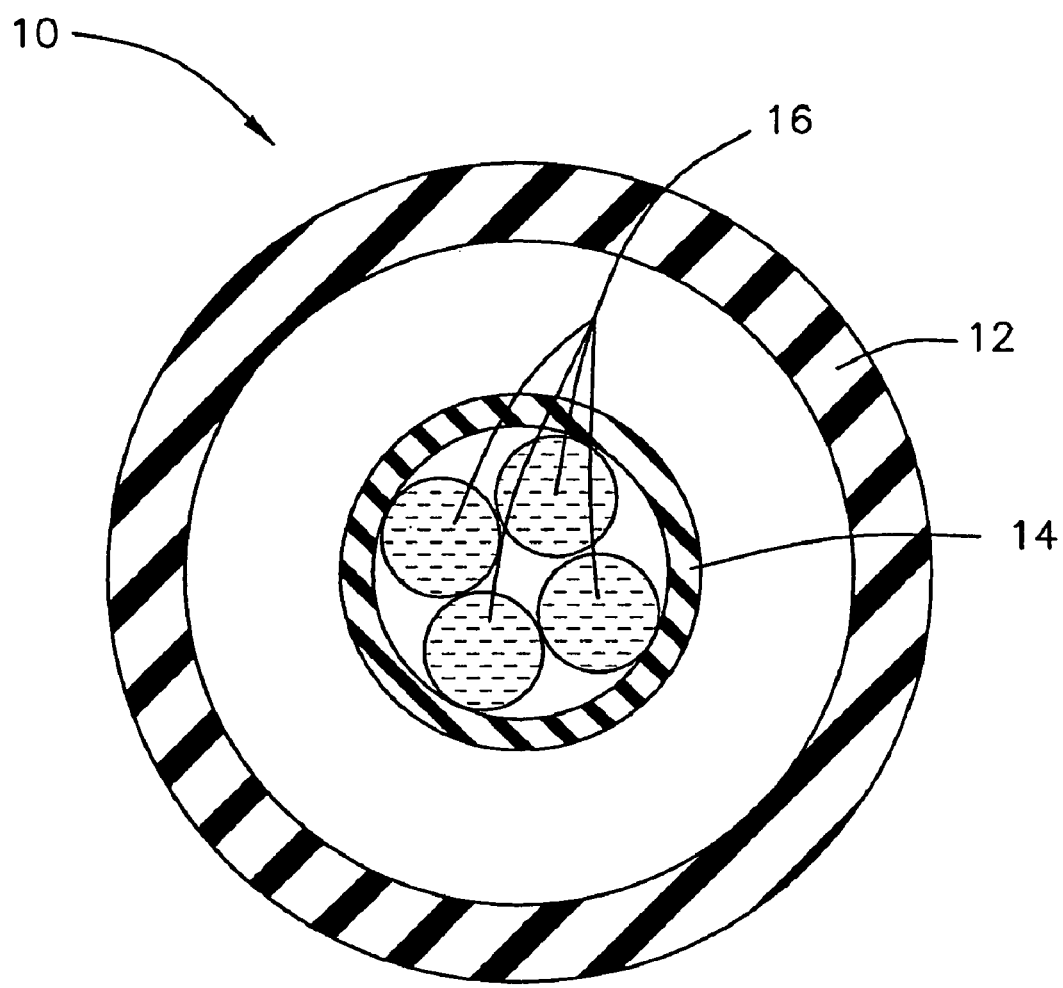
FIG. 3 illustrates an optical fiber cable in accordance with one embodiment.

In one embodiment, FIG. 3 illustrates an optical fiber cable 10 according to the present invention. Optical fiber cable 10 includes an outer jacket 12, a fiber tube 14, and four optical fibers 16 contained within fiber tube 14 in a loose tube arrangement.

Jacket 12 and tube 14 are preferably constructed of a standard polymer used in the optical fiber industry such as FRPVC (Flame Retardant Polyvinylchloride), PVDF (Polyvinydiene Fluoride), FEP (Fluorinated Ethylene Propylene) and PE (Polyethylene), however other polymers may be used based on desired fire safety, costs and flexibility considerations. Preferably, tubes 14 may be color coded for proper organization and identification of the tubes within cable 10 as will be described in more detail below.

Fibers 16 are preferably typical UV coated optical fibers 250 microns in diameter of the type commonly used in fiber optic signal transmission. As with tubes 14, preferably fibers 16 may be color coded for proper organization and identification of the fibers within cable 10.

Figure 4:
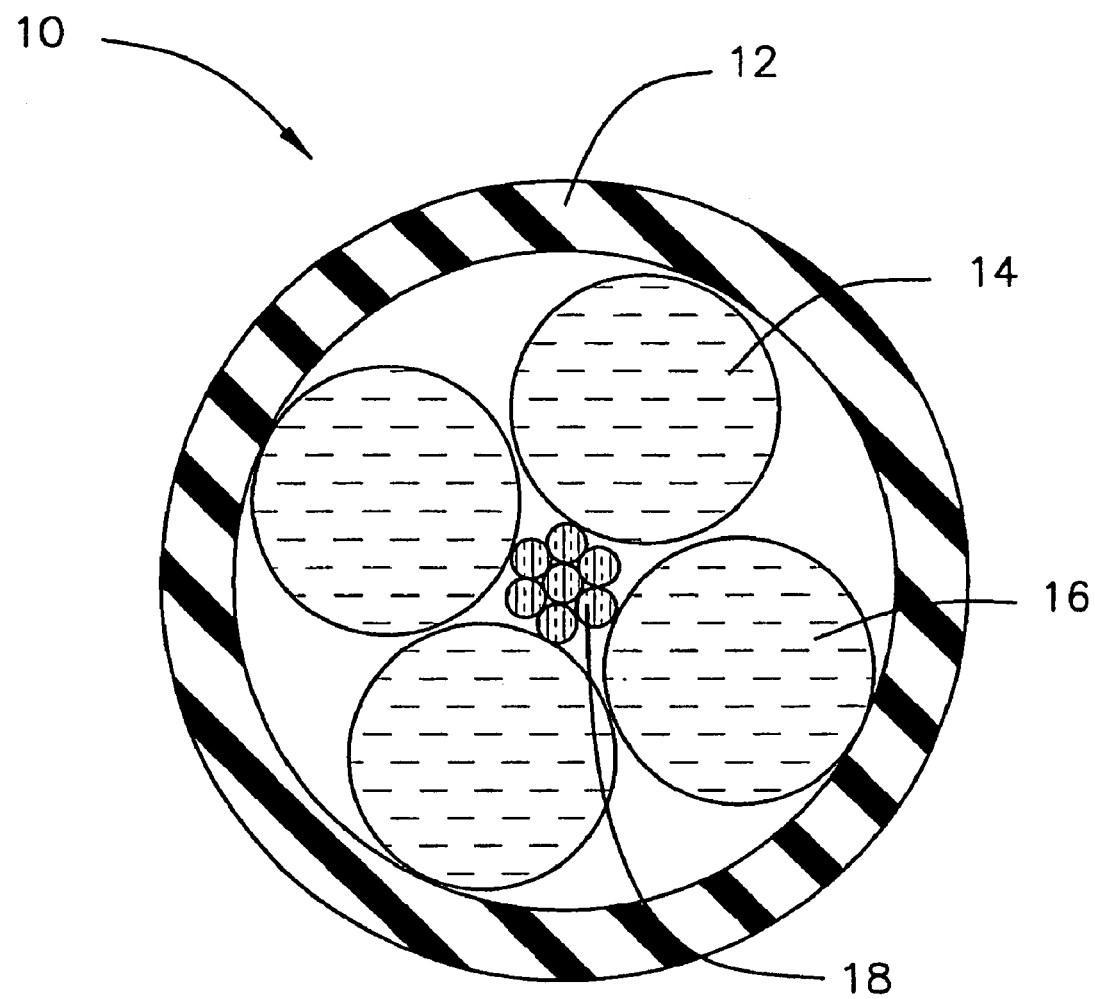
FIG. 4 illustrates an optical fiber cable in accordance with another embodiment.
Figure 5A:
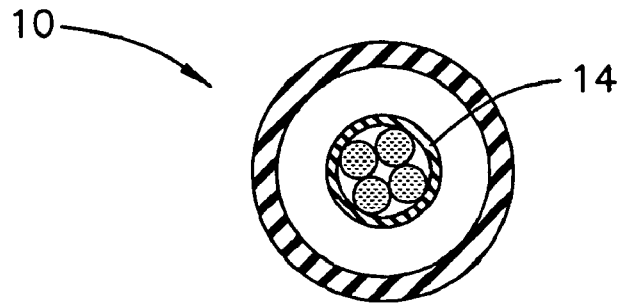
FIGS. 5A-5M illustrate optical fiber cables of different sizes in accordance with several embodiments.
Figure 5B:
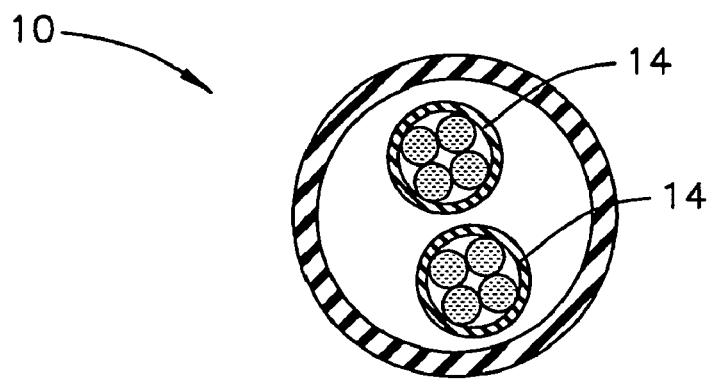
Figure 5C:
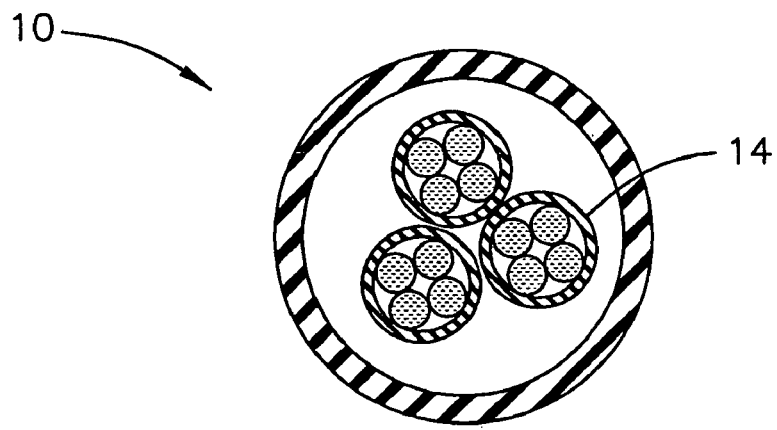
Figure 5D:
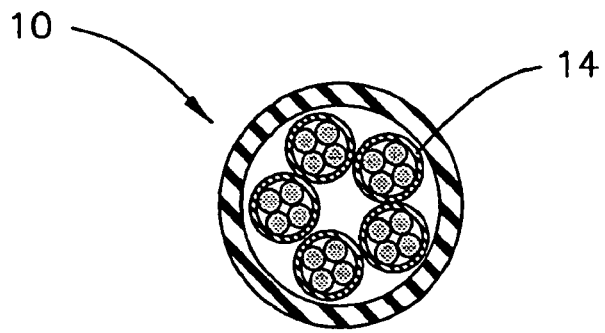
Figure 5E:
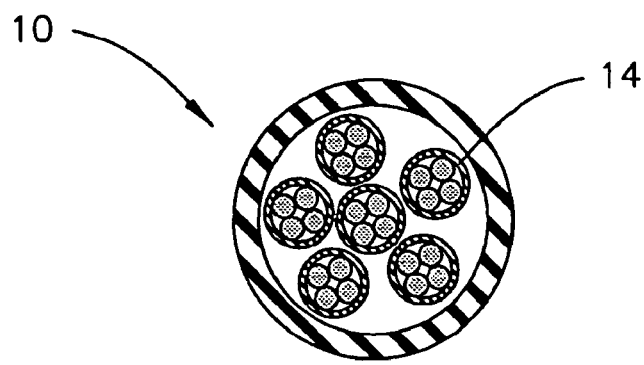
Figure 5F:
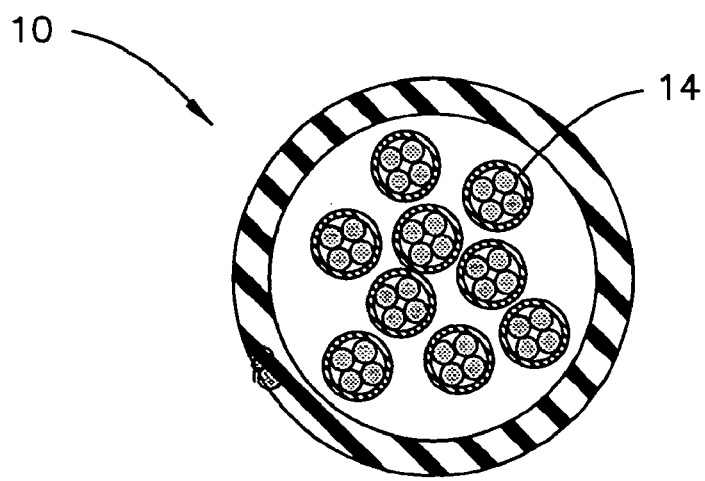
Figure 5G:
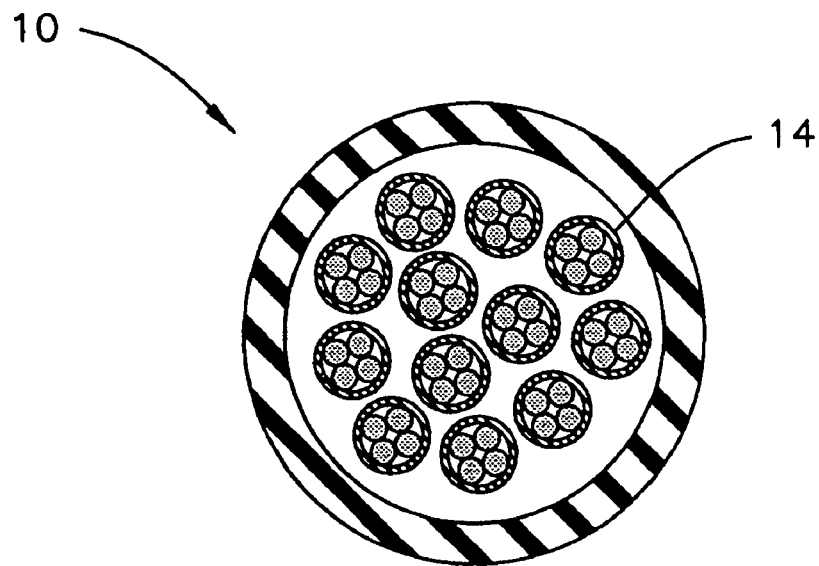
Figure 5H:
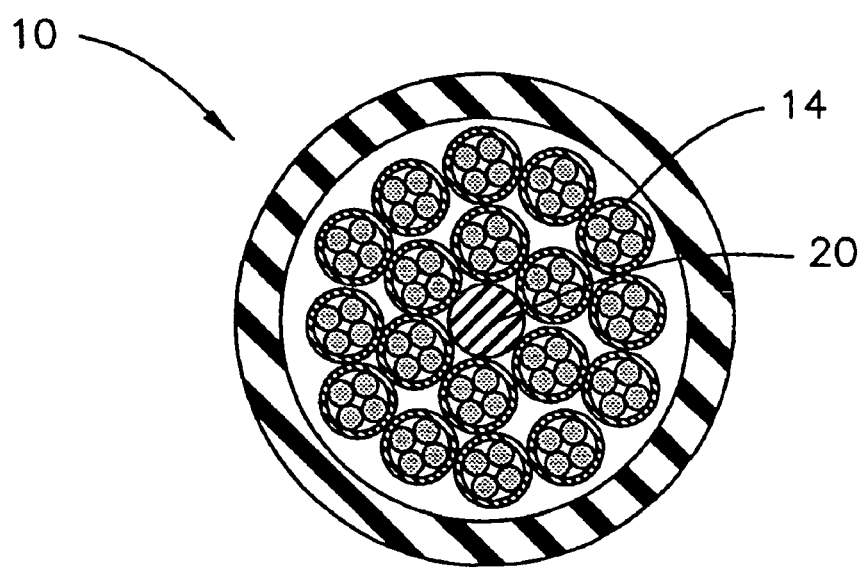
Figure 5I:
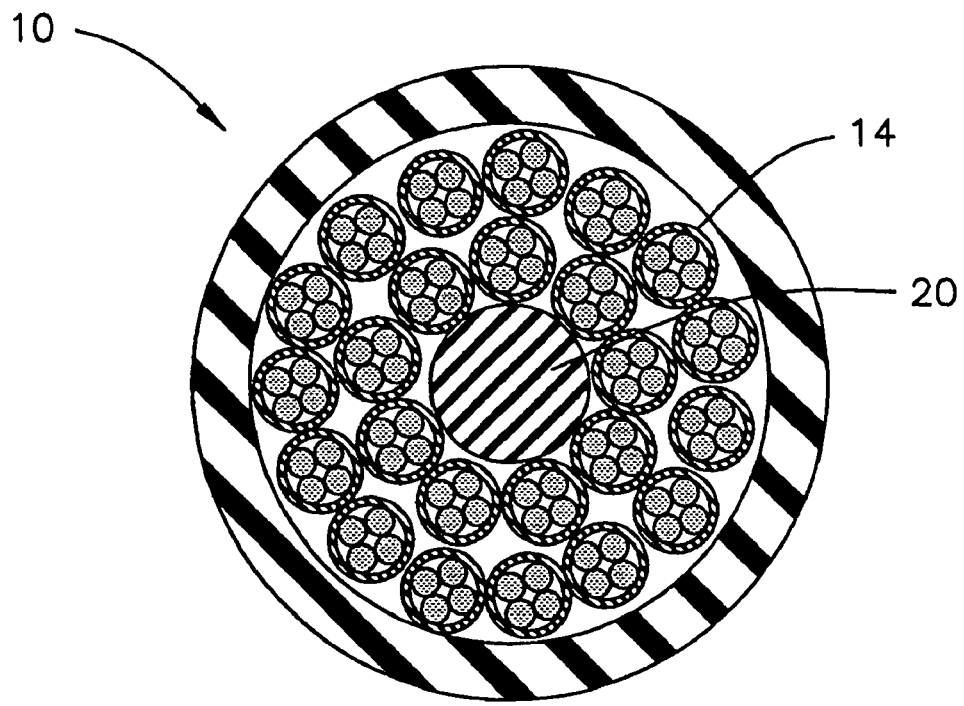
Figure 5J:
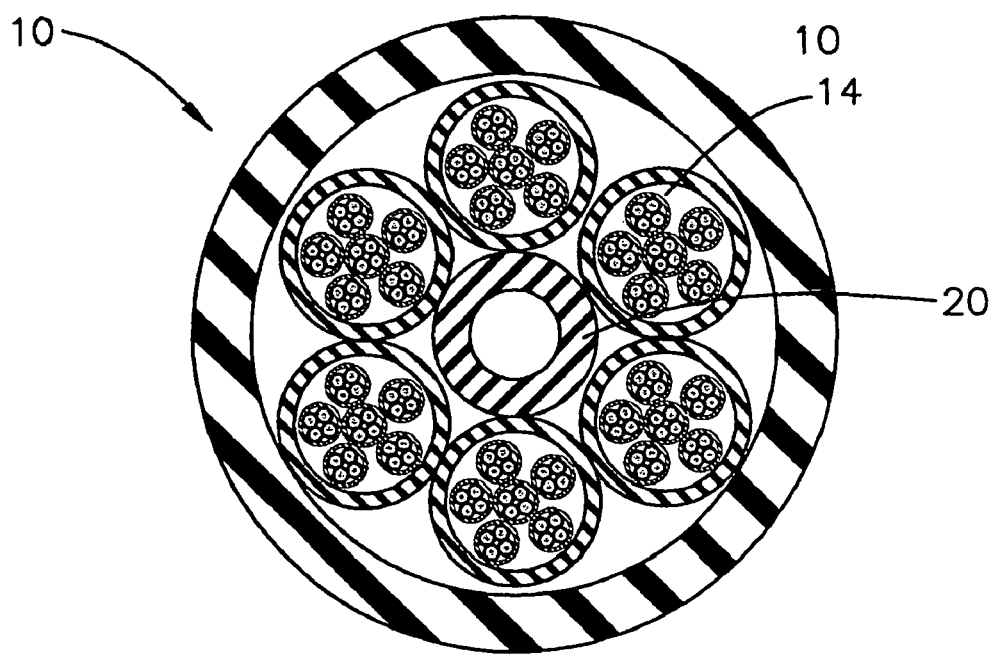
Figure 5K:
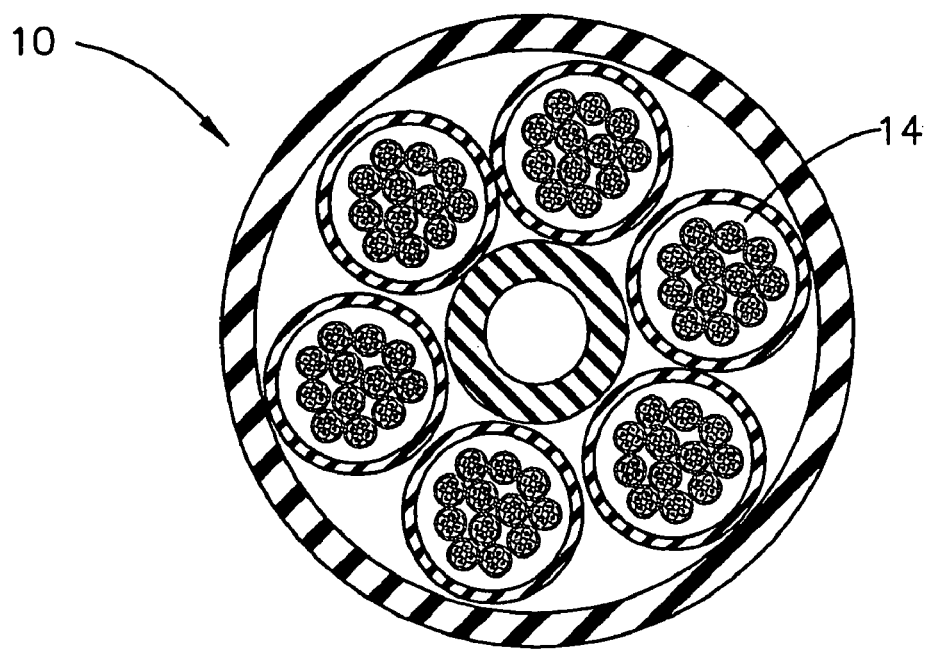
Figure 5L:
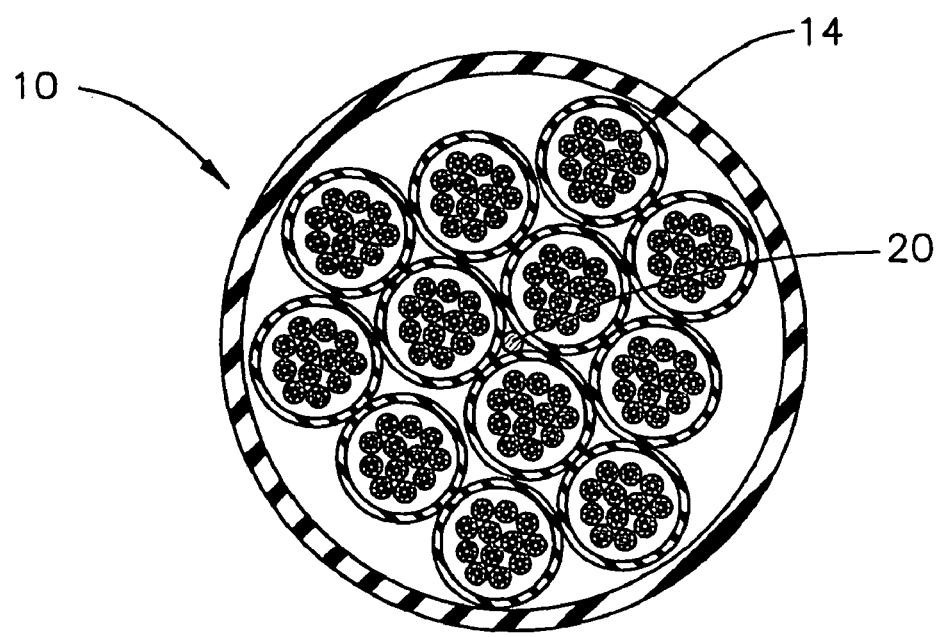
Figure 5M:
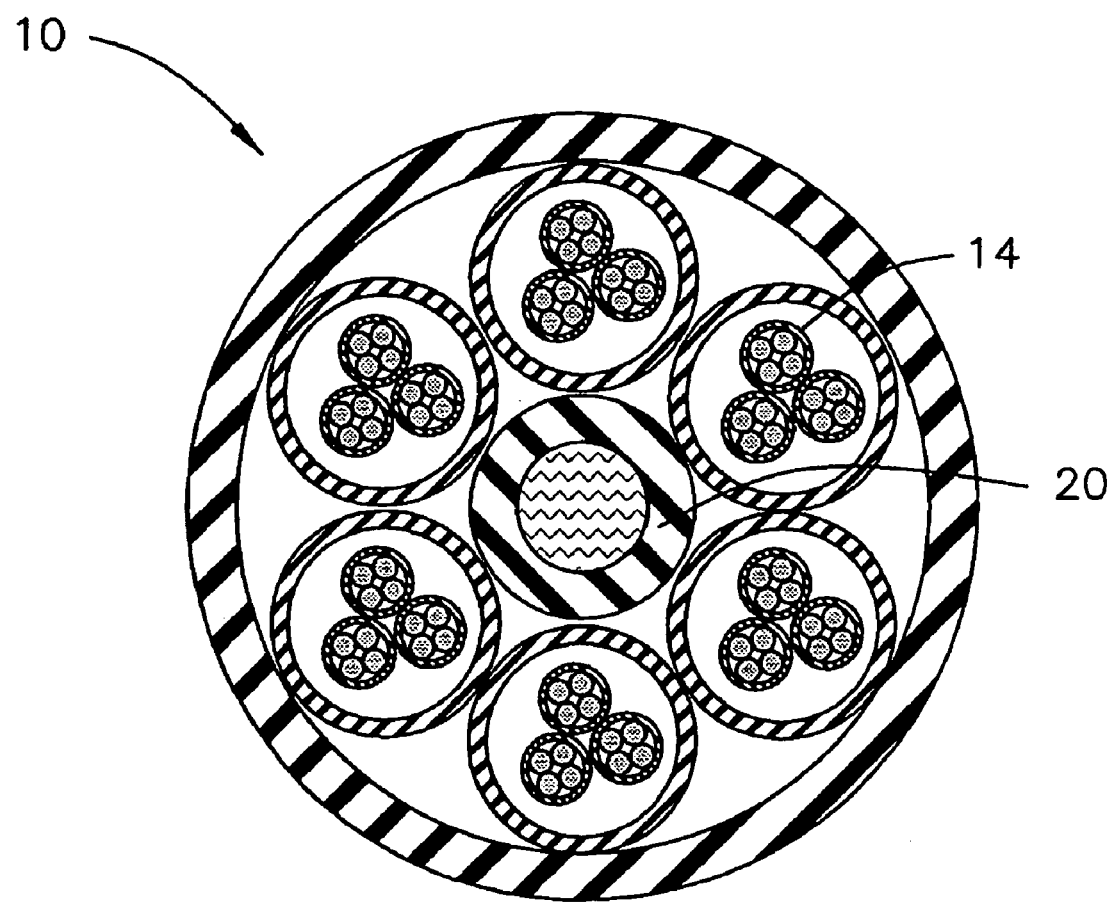

In another embodiment, illustrated in FIG. 4, water swellable yarns 18 may be added to the center of tube 14 between fibers 12. Water swellable yarns 18 are optionally helically spun and are used for both moisture absorption and to create a buffer space in the center of fibers 16 so that after extrusion and assembly of tubes 14, there is room in the center of fibers 16 for movement during the bending of cable 10 as explained in more detail below.

In one embodiment, FIGS. 5A-5G show various arrangements for cables 10 having one or more tubes 14, each of which maintain a four fibers 16 per tube configuration as described above. FIGS. 5H-5M show additional arrangements of larger cables 10 having more numerous tubes 14 and a central component 20 such as strength member formed, by example, from GRP (Glass Reinforced Polymer).

It is understood that the above described cables 10 are exemplary configurations. Any similar cables 10 using one or more tubes 14, each of which having similar four fiber geometry, are within the contemplation of the present invention.

In the above described cables 10, in each case, tubes 14 still maintain the above geometry of four fibers 16. Turning now to the size and geometry of tubes 14, preferably the outer diameter of tube 14 is substantially 0.042" and the inner diameter is substantially 0.025". Such an arrangement allows 20" strip capability for the installers of cable 10 while maintaining optical signal capacity at or above attenuation performance standards such as GR-409, GR 20 and ICEA 596 in temperatures in the range of 0° C. through −60° C. (with a possible attenuation change of 0.10 db/km at the lower rated temperatures). In an alternative arrangement which may perform in the lower range (of −40° C. through −60° C.), the outer diameter of tube 14 is substantially 0.038" and the inner diameter is substantially 0.0245". Here the strip capacity is reduced to 1"-3" due to the coefficient of friction or tightness of the jacket 14 against fibers 16.

Figure 6:
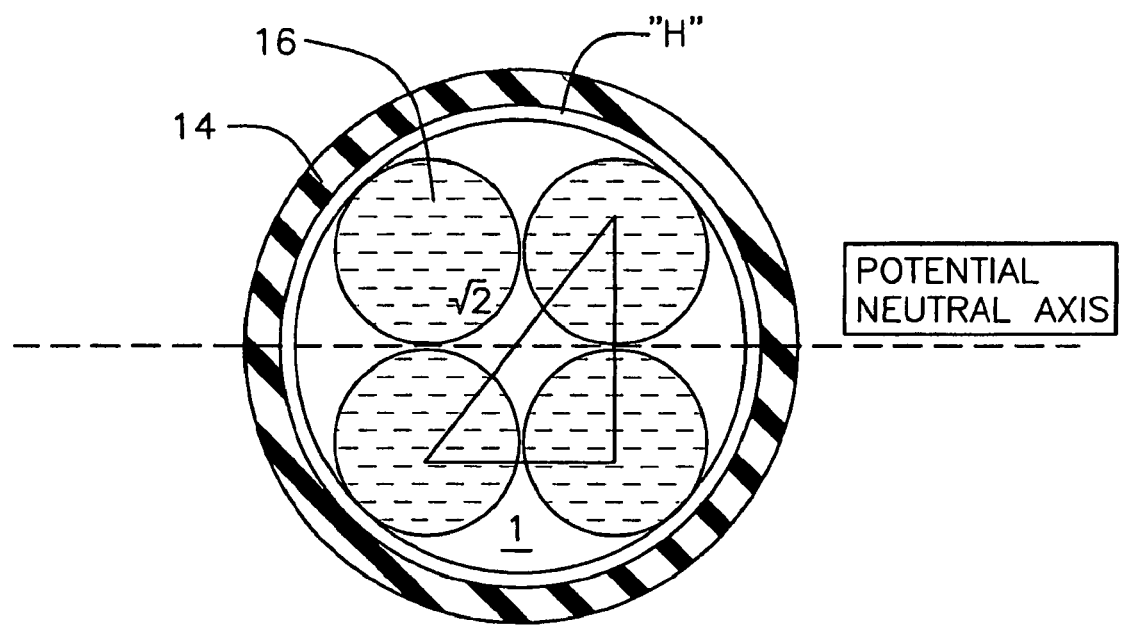
FIG. 6 illustrates an optical fiber cable in accordance with one embodiment.

Using the above example of an outer diameter of 0.042" as a basis, and based on the fiber 16 diameters of 250 nm or 0.00984", a 5% gap is created between the internal diameter of tube 14 and fibers 16. For example, as shown in FIG. 6, calculating the diameter of a circle drawn hypothetically around the four fibers 16 (labeled "H" in FIG. 6) is done according to the following equation:

$$(1.41421+1) \times 0.00984" = 0.023761. [(\sqrt{2}+1) \times \text{Diameter of fiber}]$$

As this diameter is substantially 5% less than the internal diameter of tubes 14, there is room for fibers 16 to flex their center's position relative to a neutral axis of bending (but not randomly twists or cross each other) within tube 14 during bending as described below.

In another embodiment, a gap of about 4% is feasible in the arrangement with the outside/inside diameter of jacket 12 as 0.038/0.0245.

Such an inner diameters for tube 14 are ideal for using a 0.25" setting on the commonly used miller stripping tool, and where the gap between the fibers 16 and tube 14 and the ability of fibers 16 to move somewhat, prevents them from being cut during stripping.

It is understood that although the above examples show an inner diameter of tube 14 as 0.025" it is possible that a larger diameter may be used up to 0.02622" (four fibers 16 diameter+¼ fiber diameter) and even up to 0.02868" (four fibers 16 diameter+¾ fiber diameter). The limit of such internal diameter of tube 14 being that it provides a sufficient gap to allow fibers 16 to move within tube 14 given the low modulus of the plastic used for tube 14, while simultaneously being allowed sufficiently little space so as to prevent random twisting or tangling of the un-stranded fibers 16.

Furthermore, the above arrangement, with the above described internal diameters of tube 14, is also dimensioned to allow a 20" strip of tube 14 from fibers 16. This is facilitated by the substantially 5% gap between fibers 16 and tube 14 and is such that the design couples the stiffness necessary to prevent the fibers from becoming wavy within tube 14 while not being overly constricted against fibers 16.

In another arrangement, the wall thickness is reduced from 0.00875" (OD−ID/2 or 0.042−0.0245/2) to 0.0085", and possibly as low as 0.004" whereby this reduced amount of plastic for tubes 14 would lend less restrictive forces to fibers 16 by way of less volume or mass. In such an arrangement the inner diameter of tube 14 may be placed in the range of substantially 0.027" and an outer diameter of 0.035".

In the present example, the polymer employed for tubes 14 of this reduced-wall thickness construction may employ a Young's modulus that results in a lower tensile strength range of 2500 PSI-2800 PSI with a coefficient of thermal expansion of substantially $3 \times 10^5 - 5 \times 10^5$ per ° C. as opposed to polymers used in typical prior art arrangements using 4000-10,000 PSI rated polymers. One example of polymer used for tubes 14 may be a 2800 PSI tensile FRPVC plenum grade polymer.

The dimensions of optical fibers 16 and tubes 14 described above is such that cables 10 are able to be constructed with a minimum or no strength members as well as without the need for stranding of fibers 16. As described below, the four-fiber geometry allows for optimum movement during bending, without crowding of the fibers so as to optimize between bending stress durability and the number of high multi-fiber cables 10.

Figure 7A:
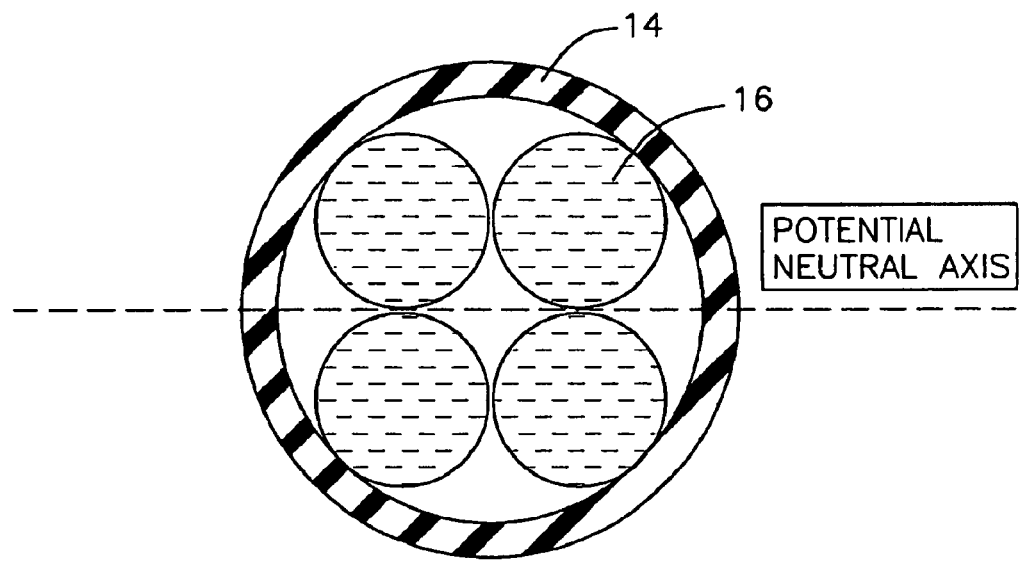
FIG. 7A illustrates the fiber tube cross section from the optical fiber cable from FIG. 3 along a potential neutral axis.

FIG. 7A illustrates cable 10 along a potential bend axis. In this configuration, each fiber 16 is separated from the hypothetical neutral bend axis by ½ of its diameter. Thus, according to a hypothetical 3 inch bend radius, the fiber circumference delta (length/length) is calculated as:

$$(0.005"/3") \times 100\% = 0.17\%$$

Because fibers 16 are not locked into tubes 14 some mismatching in length may occur when cable 10 is bent. When a cable/tube is bent around any radius the fibers closest to the inner circumference of the bend exhibit a mismatch in total distance needed to be traversed versus those fibers along the outer circumference of the bend. The resulting differences in distance causes a fiber length mis-match which is one of the contributing factors to undesirable attenuation as well as contributing to Skew and PMD.

For example, Table 1 below, is a comparison of fiber length mismatch assuming a coil of 3" radius (bend radius) 10 where the concern would be about the relative length mismatches between each of the fibers 16 as they follow the various circumferences as shown in the following table 1.

Columns 1 and 5 are for four fibers in a locked (stranded, wrapped, no gap etc. . . . ) arrangement, columns 2 and 6 are for four fibers according to the present arrangement, columns 3 and 7 are for six fibers in a tube according to the prior art and columns 4 and 8 are for 12 fibers in a tube according to the prior art

TABLE 1

| | | | | | | | | |
|---|---|---|---|---|---|---|---|---|
| Central Axis radius (inches) | 3 | 3 | 3 | 3 | 6 | 6 | 6 | 6 |
| Number of fibers | 4 | 4 | 6 | 12 | 4 | 4 | 6 | 12 |
| Approximate fiber diameter (inches) | 0.01 | 0.01 | 0.01 | 0.01 | 0.01 | 0.01 | 0.01 | 0.01 |
| Fiber Group Diameter (inches) | 0.017 | 0.017 | 0.024 | 0.035 | 0.017 | 0.017 | 0.024 | 0.035 |
| Closet Fiber Distance from axis (inches) | 0 | 1 | 0 | 1 | 0 | 1 | 0 | 1 |
| Farthest fiber distance from axis (inches) | 0.012 | 0.005 | 0.014 | 0.025 | 0.012 | 0.005 | 0.014 | 0.025 |
| Closest fiber circumference (inches) | 9.42 | 9.42 | 9.42 | 9.42 | 18.85 | 18.85 | 18.85 | 18.85 |
| Farthest fiber circumference (inches) | 9.46 | 9.44 | 9.47 | 9.50 | 18.89 | 18.87 | 18.90 | 18.93 |
| Circumference mismatch (%) | 0.40% | 0.17% | 0.48% | 0.82% | 0.20% | 0.08% | 0.24% | 0.41% |

In another example, Table 2 shows a similar chart to Table 1 regarding fiber length mismatches only with a more extreme bending situation of 20 turns on a 7" mandrel.

For example, if cable 10 or tube 14 of fibers 16, in an extreme situation, is wrapped around a 0.7" diameter mandrel for 20 turns, this would further exacerbate the cumulative mismatch of lengths between each of fibers 16 within tube 14, generating a significant strain. This strain occurs during the bending of the cable where the outer fibers 16 along the out circumference of the bend are stretched and the inner fibers 14 along the inner circumference of the bend buckle, as they are forced (through friction etc. . . . ) to eqiuvicate, at least partially, their length with the shrinking length of the inner diameter of tube 14 and the lengthening of the outer diameter of the tube 14 during the winding.

Column 1 is for four fibers in a locked arrangement, column 2 is for four fibers according to the present arrangement, column 3 is for six fibers in a tube according to the prior art and column 4 is for 12 fibers in a tube according to the prior art.

TABLE 2

| Mandrel Wrap | | | | |
|---|---|---|---|---|
| # turns | 20 | 20 | 20 | 20 |
| Mandrel (inches) | 0.7 | 0.7 | 0.7 | 0.7 |
| unit od (inches) | 0.044 | 0.044 | 0.05 | 0.053 |
| length (inches) | 46.75 | 46.75 Shifted | 47.12 | 47.31 |
| Central Axis radius (inches) | 0.7 | 0.7 | 0.7 | 0.7 |
| Number of fibers | 4 | 4 | 6 | 12 |
| Approximate fiber diameter (inches) | 0.01 | 0.01 | 0.01 | 0.01 |
| Fiber Group Diameter (inches) | 0.017 | 0.017 | 0.024 | 0.035 |
| Closet Fiber Distance from axis (inches) | 0 | 1 | 0 | 1 |
| Farthest fiber distance from axis (inches) | 0.012 | 0.005 | 0.014 | 0.025 |
| Closest fiber circumference (inches) | 2.20 | 2.20 | 2.20 | 2.20 |
| Farthest fiber circumference (inches) | 2.24 | 2.21 | 2.24 | 2.28 |
| Circumference mismatch (%) | 1.72% | 0.71% | 2.07% | 3.52% |
| Cumulative mismatch (inches) | 0.8061 | 0.333906 | 0.976 | 1.665 |

From the above two tables, column 2, representing the four-fiber 16 arrangement of the present invention results in the lowest cumulative mismatch percentages, regardless of the number of turns. Such an advantage becomes more pronounced over the six fiber and twelve fiber prior art designs as the number of turns is increased (such as in table 2).

For example, the 0.17% fiber mismatch of the present four-fiber arrangement is a significant improvement over the 0.48% mismatch and 0.82% mismatch of the six and twelve fiber prior art arrangements respectively.

Figure 7B:
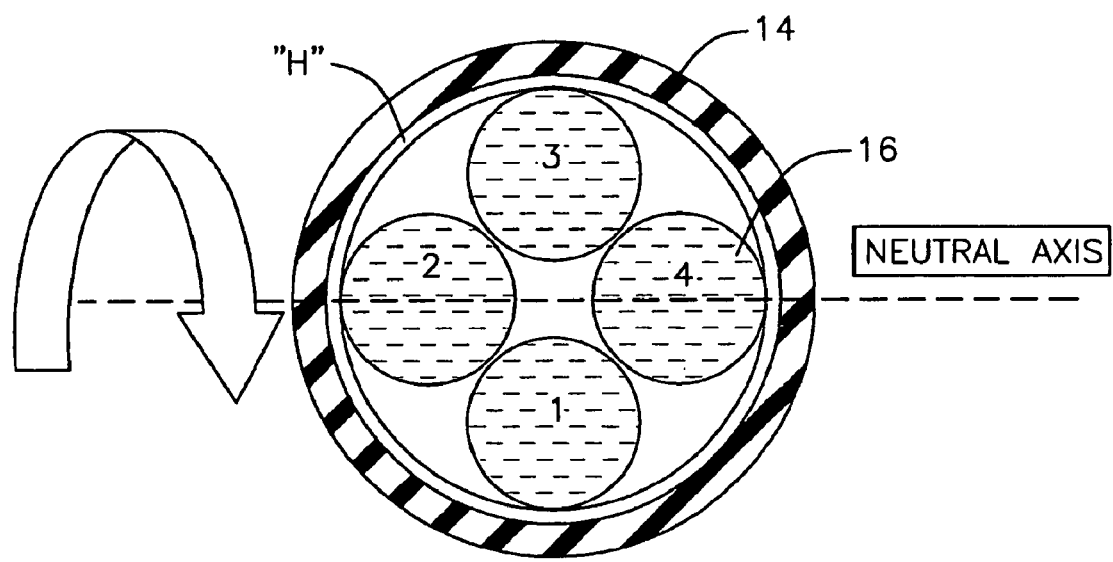
FIG. 7B illustrates the fiber tube cross section from the optical fiber cable from FIG. 6A bent over the neutral axis.

As shown in FIG. 7B, the four fiber geometry of tubes 14 results in a bend configuration whereby two of fibers 16 (shown as upper and lower fibers 16 in FIG. 6B) remain apart from the bend axis and two of fibers 16 (shown as left and right fibers 16 in FIG. 6B) within tube 14 move into the bend axis. Such an arrangement, allows half of the fibers to remain in the bend axis, a configuration that higher count fiber tubes from the prior art can not achieve, and thus results in the potential circumference mismatch of the present invention being shifted from 0.40% as in the prior art to 0.17%, as noted in Table 1.

Stated another way, in this case the minimum stress state (0% mismatch) is reached for the two fibers 16 that occupy the neutral axis of the potential bend.

In other embodiments of the present invention, such bend results are similarly achieved in each of the tubes 14 in the case of multi-tube 14 cables 10 such as those shown in FIGS. 5B-5M. For example, in these arrangements, tubes 14, constructed as above, are then stranded as a larger population of tubes 14 within a larger jacket 12, possibly around a csm (central strength member 20).

In addition to the general arrangement of fibers 16 within tubes 14, another manner for keeping the fiber lengths equal or substantially equal to one another, in order to reduce Skew and PMD, is to perform tighter controls on the fiber tension during the tube 14 extrusion and cable 10 assembly.

In one arrangement, payoff tensions of fibers 16 during preparations into tubes 14 are conducted at approximately 50 grams tension, with payoff tension tolerances between the four fibers 16 in the range of 0%-4% and preferably 2% or less. Such tensions result in fiber length differentials in the range of 0.01% to 0.04%. It is understood that different tensions may be used (50 grams to 100 grams is typical), provided that the tolerance on tensions is kept substantially within the ranges outlined above between the fibers 16 within a tube 14. This arrangement, provides for a cable 10 where the Skew measurement of fibers 16 are substantially in the range of 0.5-2.0 ps/m, significantly better than that of prior art loose tube arrangements. Moreover, because of the loose tube arrangement, these Skew measurements are not severely affected upwards during bending and installation unlike prior art ribbon configurations.

In another embodiment of the present invention, during placement of fibers 16 within tubes 14 on the extrusion/cable production line, use of direction sheaves are avoided entirely or reduced. Direction sheaves and other mechanical elements are typical in extrusion equipment to guide the fibers into alignment before the tubes are extruded thereon. In the present instance, by reducing or eliminating these items, the number of contact points for fibers 16 are correspondingly reduced or eliminated, prior to being covered by tube 14, which would have otherwise caused different contributions of drag on fibers 16. Such an arrangement keeps the final (or inked) fiber diameters of fibers 16 as equal as possible to one another as well as keeping their surface contours as similar as possible. Additionally, fibers 16 may be physically arranged in front of the extrusion line, prior to cable 10 constructions, so that the fiber paths from the spools of fibers (payoff reels) towards tube 14 is centered in the guide tubes, keeping fibers as free as possible from direction changes as it leaves the fiber pay-off reel and travels to the entrance of tube 14.

Figure 10:
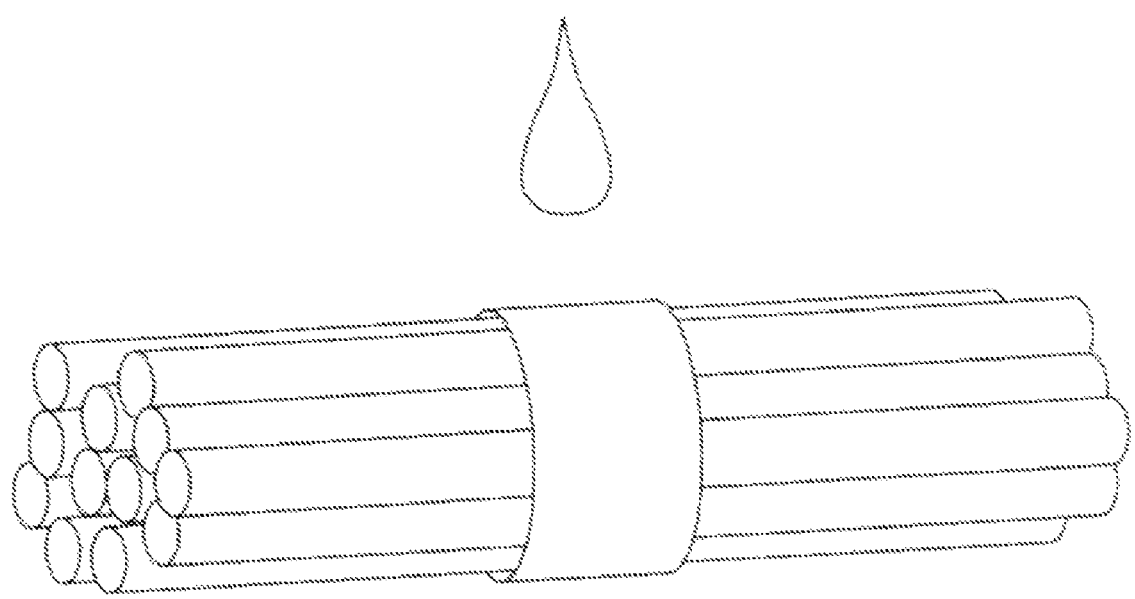
FIG. 10 is a prior art twelve fiber loose tube fiber cable with periodic binding, exhibiting poor Skew and PMD test results.
Figure 11:
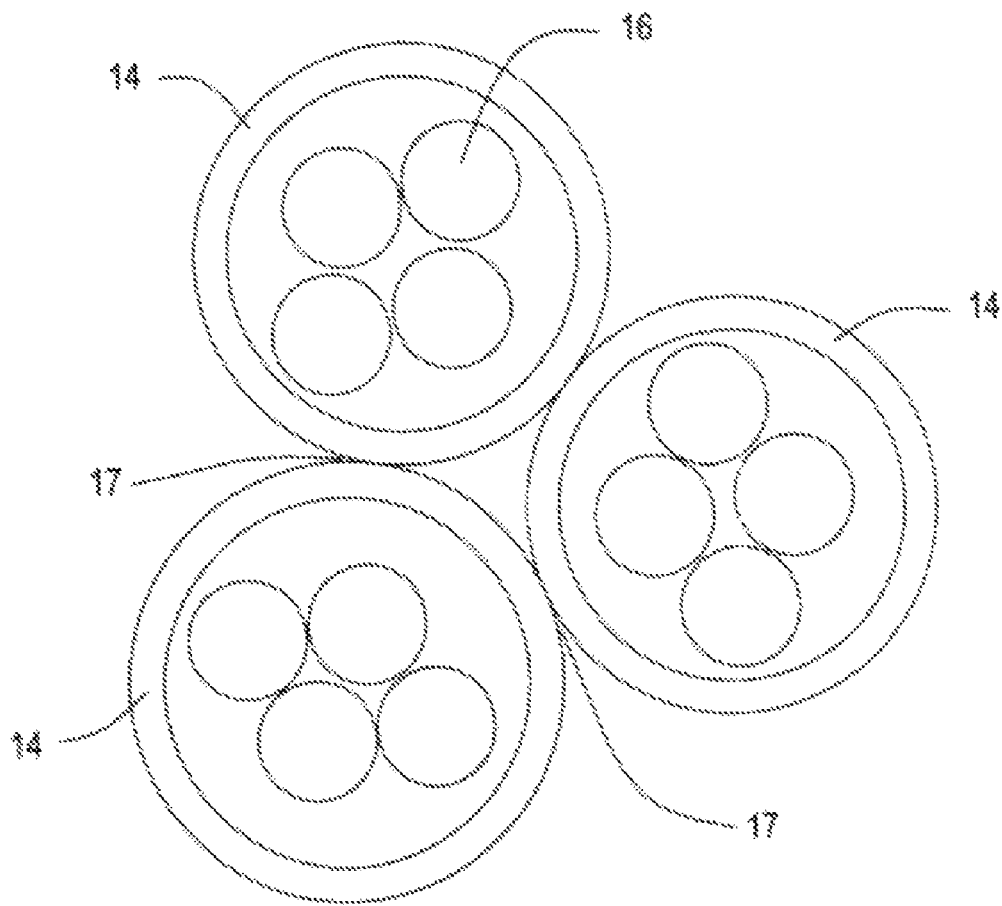
FIG. 11 illustrates an optical fiber cable in accordance with another embodiment.

In another embodiment of the present invention, as shown in FIG. 11, in order to further assist in getting the lengths of fibers 16 nearly equal over the length of cable 10, each of the three tubes 14 may be coupled to one another using polymer bridges 17 formed during the extrusion process. By keeping the three tubes 14 bound to one another, it helps keep the fibers 16 within a better overall length differential tolerance, helping to reduce Skew. Such an arrangement with the connectivity between tubes 14 (instead of on the fibers 16 directly as in the prior art method shown in FIG. 10) simultaneously allows for the fibers 16 within tubes 14 to remain relatively loose with respect to the tubes 14, allowing them to relax after bending again reducing Skew test results.

Turning to the construction of cable 10 and the arrangement of tubes 14 within cable 10, in one example of cable 10 having several stranded tubes 14, the lay length (stranding rate) of tubes 14 is preferably set to be substantially equal to the smallest typical drum diameter on which they are wrapped onto. For example, a cable 10 having several tubes 14 of the above construction stranded within a single jacket 12, may be stranded at a 12" lay length assuming that cable 10 is to be wound on a typical drum having a diameter of 12"

This stranded arrangement for tubes 14 within jacket 12 allows tubes 14 within cable 10 to achieve bends of a radius as low as 3" (or smaller in non-continuous bends), with the looseness of tubes 14 within jacket 12 allowing for sufficient adjustment to the bend stress.

Shorter lay lengths may be used when csm 20 is employed. In any case, the stranding of tubes 14 within cable 10 is such that the longitudinally arranged four fiber tubes 14 is such that necessary stiffness is retained in tubes 14 to prevent repositioning or cross over of the non-stranded fibers 16 therein during the bending of cable 10 as discussed above.

It is noted that there are some commercially available twelve fiber/per tube, multi tube cable structures where the fibers are S-Z stranded and encased within a gel filled tight tube. In these prior art arrangements the inside diameter of the tubes are 0.045" or 25%-32% greater than the twelve fiber group outside diameter or 0.034"-0.036". This spacing of 0.045"-0.035", or a 0.010 thickness, results in a fiber-inner tube diameter gap of a full fiber width which sometimes allows a crossover of fibers. These assemblies are thus highly compression or crush sensitive. To prevent attenuation, the units are very loosely stranded within hard double walled exterior assembly to prevent compression's direct impact with the interior of the fibers/tubes. In some cases this necessitates a cable outside diameter of 0.429" for a 72-fiber cable as compared to an outside diameter of 0.274" for a 72-fiber cable. Also the utilization of gel in this prior art arrangement as mentioned before in the background is a fuel and prevents such a design from being used in plenum spaces or having a plenum rating.

As a result of the dimensions noted above, and the resulting beneficial geometry of the four fiber tube 14, a 40-70% cost reduction in materials is achieved over the traditional cable configurations having the same fiber counts/per cable. Furthermore, the present design achieves attenuation results in the range of approximately 0.4/0.3 dB/km at 1310 nm-1550 nm for single mode fibers; 02.23/0.56 dB/km at 850 nm-1300 nm for 50 micron fibers; and 2.85/0.57 db/km at 850 nm-1300 nm for 62.5 micron fibers at room temperature after manufacture. This indicates a very small increase in attenuation in the range of 0.05-0.1 dB/km from the incoming fiber, prior to placement within the tight tube. Prior art cables having the same number of fibers 16 arranged in tubes with more than four fibers per tube, such as six and twelve fiber dry tubes, which display attenuation results in the range of 1.4/1.3 dB/km for single mode fibers resulting in a typical 1 db increase in attenuation. Similarly, multimode fibers of 50 micron or 62.5 micron core diameter typically see an increase in 0.5-1.0 db/km in the 6 and 12 fiber dry tight tubes at their measured and operation wavelengths of 850 and 1300 nm. With gel, presumably the attenuation of these six and twelve fiber tubes could be reduced somewhat, but it would then be unable to meet the desired fire safety standards.

In sum, the above described four fiber 16 construction within tubes 14, regardless of whether cable 10 maintains one or more tubes 14, allows the opportunity to achieve a minimal stress state on fibers 16 without stranding the fibers within tubes 14 or having a great area of looseness within tube 14. The longitudinal orientation of fibers 16 greatly aids in crush performance as fibers 16 are not criss-crossing when weight is applied to cable 10. This prevents fibers 16 in the present arrangement from microbending on themselves as is the case with the prior art arrangements where attenuation results from crisscrossing of stranded fibers within the tubes and the allowance of random fiber placement in the larger looser tubes.

In another embodiment, it is understood that the four fiber 16 per tube 14 arrangement as described herein is different than the typical six and twelve fiber industry standard arrangements. In order to facilitate back-connection to pre-existing color coding systems, such as the TIA 598 color standard, the arrangement of the present invention is such that for every three tubes 14, all twelve color fibers 16 of the standard colors are represented.

For example, the current TIA standard employs a twenty four color standard which calls for twelve colors different colors, then using the same twelve colors with black dashes for fibers thirteen through twenty four.

TABLE 3

Color Code Chart: Fiber Optic Cables*

| Fiber/Tube No. | Color |
|---|---|
| 1 | Blue |
| 2 | Orange |
| 3 | Green |
| 4 | Brown |
| 5 | Gray |
| 6 | White |
| 7 | Red |
| 8 | Black |
| 9 | Yellow |
| 10 | Purple |
| 11 | Rose |
| 12 | Aqua |

*Per TIA/EIA 598-A

Figure 8:
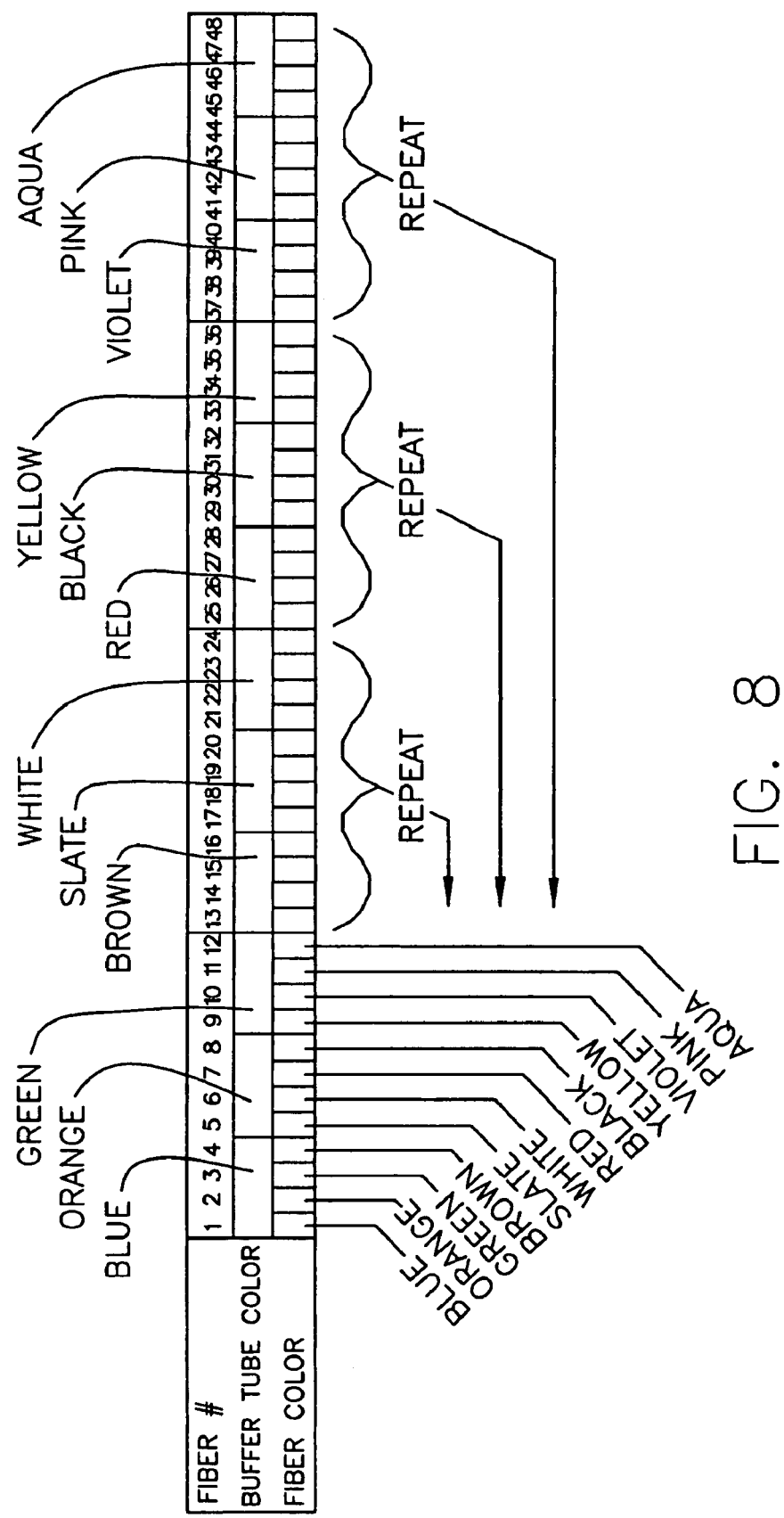
FIG. 8 illustrates a sample 36 fiber cable with coloring of the fibers in accordance with one embodiment.
Figure 9:
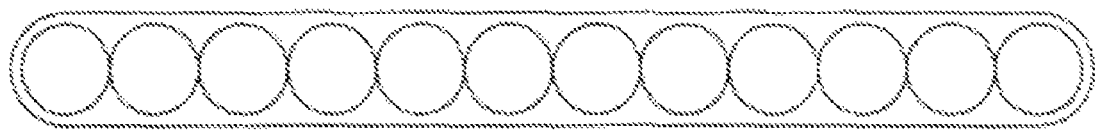
FIG. 9 is prior art ribbon cable exhibiting poor Skew and PMD test results.

For example, as illustrated in FIG. 8, in one arrangement of a forty eight fiber cable 10 having twelve tubes 14, each of four fibers 16, the tubes 14 may be colored in accordance with the below described sequence. The first four tubes colored Brown, Blue, Red and Violet each maintain four fibers 16 of the colors Blue, Orange, Green, and Violet. The second four tubes 14 are colored Orange, Slate, Black and Rose and each maintain four fibers 16 of the colors Slate, White, Red and Black. Finally, the third set of four tubes 14 are colored Green, White, Yellow and Aqua and each maintain four fibers 16 of the colors Yellow Violet Rose and Aqua.

In such an arrangement, for each set of three tubes 14 (as shown sequentially divided in Figure), the arrangement of the present invention has the twelve color fibers 16 from the conventional arrangement for group connectorization or ribboning with existing While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A fiber optic cable, said cable comprising:
    a jacket;
    a plurality of tubes within said jacket; and
    at least two fibers within each of said tubes in a loose tube arrangement,
    wherein said plurality of tubes are connected to one another by polymer bridges, so that when said cable is twisted or bent, said tubes move together within said jacket; and
    wherein said fibers within said tubes have a fiber length differential substantially in the range of 0.01%-0.04%.

2. The fiber optic cable as claimed in claim 1, wherein said jacket includes three tubes.

3. The fiber optic cable as claimed in claim 2, wherein each of said tubes includes four fibers.

4. The fiber optic cable as claimed in claim 1, wherein each of said fibers within said tube are installed under payoff tensions tolerances of 0%-4% relative to one another.

5. The fiber optic cable as claimed in claim 4, wherein each of said fibers within said tube are installed under payoff tensions tolerances of substantially 2% or less, relative to one another.

6. The fiber optic cable as claimed in claim 1, wherein said fibers within said tubes exhibit a skew measurement of substantially 0.5-2.0 ps/m (picoseconds per meter).

7. A method for making a fiber optic cable, said method comprising the steps of:
    running a plurality of fibers into an extrusion line;
    extruding a plurality of tubes onto at least a portion of said plurality of fibers in a loose tube arrangement;
    extruding a jacket onto said tubes,
    wherein said plurality of tubes are connected to one another by polymer bridges, so that when said cable is twisted or bent, said tubes move together within said jacket; and
    wherein said plurality of fiber in said extrusion line are installed under payoff tensions tolerances of 0%-4% relative to one another.

8. The method as claimed in claim 7, wherein said fibers are installed under payoff tensions tolerances or substantially 2% of less, relative to one another.

9. The method as claimed in claim 7, wherein said step of running a plurality of fibers into an extrusion line is done for four fibers.

10. The method as claimed in claim 9, wherein said step of extruding at least one tube onto said fibers in a loose tube arrangement, includes extruding three tubes each onto said four fibers.

11. The method as claimed in claim 7, wherein said fibers are run into said extrusion line under a payoff tension of substantially 50-100 grams.

12. The method as claimed in claim 7, wherein said fibers within said cable are manufactured so that they exhibit a fiber length differential substantially in the range of 0.01%-0.04%.

13. The method as claimed in claim 7, wherein said fibers within said cable are manufactured so that they exhibit a skew measurement of substantially 0.5-2.0 ps/m (picoseconds per meter).

14. The method as claimed in claim 7, wherein said fibers are positioned prior to said extrusion line so that the fiber path is substantially free of direction changes, reducing or eliminating direction sheaves.

15. The method as claimed in claim 7, wherein said fibers are arranged within said tubes of said cable to exhibit a fiber length differential substantially in the range of 0.01%-0.04%.

16. The method as claimed in claim 7, wherein said fibers are arranged within said tubes of said cable to exhibit a skew measurement of substantially 0.5-2.0 ps/m (picoseconds per meter).

* * * * *